United States Patent Office 3,144,440
Patented Aug. 11, 1964

3,144,440
5H-DIBENZ[b,f]AZEPIN-10(11H)-ONE
COMPOUNDS
Walter Schindler, Riehen, near Basel, and Hans Blattner, Basel, Switzerland, assignors to Geigy Chemical Corporation, Ardsley, N.Y., a corporation of Delaware
No Drawing. Filed Aug. 31, 1962, Ser. No. 220,887
Claims priority, application Switzerland Nov. 16, 1959
5 Claims. (Cl. 260—239)

The present invention relates to new azepine derivatives, which are suitable as antioxidants and as intermediate products for the synthesis of dyestuffs. They are also valuable products for the synthesis of medicaments, especially in the field of antiallergic and psychotherapeutic materials. Such valuable medicaments are set forth in our parent application S. N. 69,302, filed November 15, 1960.

It has been found that new azepine derivatives of the general formula

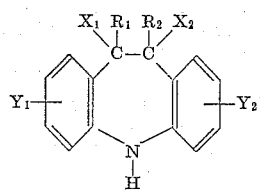

(I)

in which $R_1$ signifies a lower alkyl (1–4 carbons), lower alkenyl (3–4 carbons), phenyl or phenylalkyl wherein the alkyl contains 1–3 carbon atoms, $R_2$ signifies hydrogen or a lower alkyl (1–4 carbons), $X_1$ and $X_2$ signify hydrogen or, together, an additional linkage, and $Y_1$ and $Y_2$ independently of one another, signify hydrogen, or chlorine, may be prepared by reacting compounds of the general formula

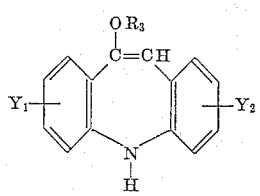

(II)

in which $R_3$ signifies a lower alkyl residue, with reactive esters of lower molecular weight alkanols or arylmethanols in the presence of a basic condensing agent, hydrolysing, preferably under acid conditions, the reaction products of the general formula

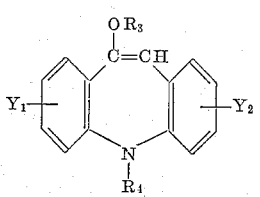

(III)

in which $R_4$ signifies a lower alkyl residue or an arylmethyl residue, to compounds of the general formula

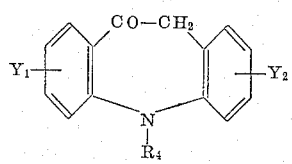

(IV)

if desired converting the latter into compounds of the general formula

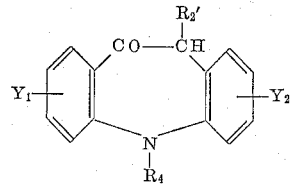

(V)

in which $R_2'$ signifies a lower alkyl or alkenyl residue, by treatment with reactive esters of lower alkanols or alkenols in the presence of a basic condensing agent, then reacting the compounds of general Formulae IV or V with compounds of the general formula $$R_1\text{—Mg—Hal} \qquad (VI)$$

in which Hal signifies chlorine, bromine or iodine, by the Grignard reaction, exposing the hydroxy compounds formed of the general formula

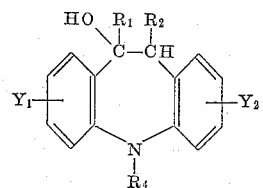

(VII)

to conditions in which water is split off, if desired reducing or hydrogenating in the 10,11-position the compounds so obtained of the general formula

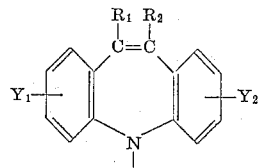

(VIII)

and treating the compounds of the general Formula VIII or their 10,11-dihydro derivatives with a concentrated hydrohalic acid in order to split off the residue $R_4$.

It has been found that the 10-alkyl-10,11-dihydro-5H-dibenz[b,f]azepines of the formula

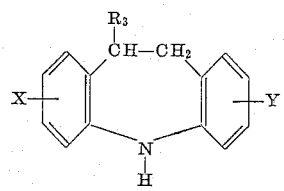

(XI)

in which $R_3$ signifies lower alkyl,
X signifies hydrogen, chlorine, bromine, lower alkyl or lower alkoxy, and
Y signifies hydrogen, halogen, lower alkyl, are useful as antioxidants and as intermediates for the production of dyestuffs as well as for the production of medicinals.

The new compounds of general Formula XI are obtained when compounds of formula

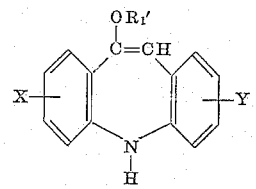

(IX)

in which $R_1'$ signifies lower alkyl and X and Y have the meanings given above, are reacted in the presence of a basic condensing agent with a reactive ester of a lower alkanol, and the reaction products of formula

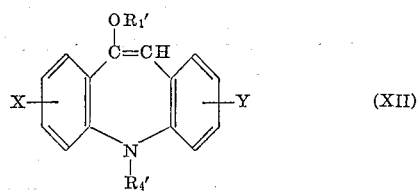

in which $R_4'$ signifies lower alkyl and X, Y and $R_1'$ have the meanings given above, are hydrolysed, preferably in an acid medium, to compounds of formula

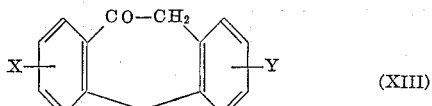

the latter are reacted with a lower alkyl magnesium halide by the Grignard reaction, the hydroxy compounds formed of formula

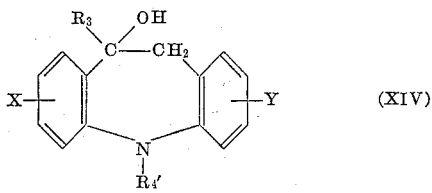

in which $R_3$, X, Y and $R_4'$ have the meanings given above, are exposed to conditions in which water is split off, the compounds so obtained of formula

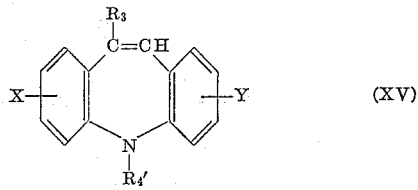

are reduced or hydrogenated in the 10,11-position and the reactions products are heated with a concentrated hydrohalic acid in order to split off the residue $R_4'$.

Starting substances of the general Formula II are, for example, 10-methoxy-5H-dibenz[b,f]azepine, M.P. 124°, 10-ethoxy-5H-dibenz[b,f]azepine, M.P. 132–133°, 10-n-butoxy-5H-dibenz[b,f]azepine, M.P. 113–114°, 10-methoxy-3,7-dichloro-5H-dibenz[b,f]azepine, M.P. 182–183°, 10-methoxy-3-chloro-5H-dibenz[b,f]azepine and 11-methoxy-3-chloro-5H-dibenz[b,f]azepine. These compounds may be obtained, starting from optionally substituted 5-acyl-10,11-dihydro-5H-dibenz[b,f]azepines, by brominating in the 10-position with bromosuccinimide, splitting off hydrogen bromide, e.g. by heating with tertiary organic bases such as collidine, or treatment with alcoholic caustic potash solution in the cold, adding on bromine to the 5-acyl-5H-dibenz[b,f]azepines formed and reacting the 10,11-dibromo compounds obtained with at least twice the molecular amount of alkali metal compounds of low molecular weight alkanols, when the 5-acyl group is simultaneously split off.

As examples of reactive esters of lower alkanols and aryl-methanols for the reaction with compounds of the general Formula II may be mentioned methyl iodide, methyl bromide, ethyl iodide, ethyl bromide, n-propyl bromide, n-butyl chloride, dimethyl sulphate, diethyl sulphate, p-toluenesuphonic acid-methyl ester, 2,4-dinitrobenzenesulphonic acid-methyl ester, benzyl chloride and benzyl bromide.

Sodamide, lithium amide, potassamide, sodium or potassium, butyl lithium, phenyl lithium or lithium hydride are especially suitable as basic condensing agents. The reaction may be carried out in the presence or absence of an inert solvent, of which benzene, toluene and xylenes may be mentioned as examples.

The subsequent hydrolysis to keto compounds of the general Formula IV may be effected, for example, by heating the compounds of the general Formula III in an acid medium, e.g. 0.5 N to 5 N hydrochloric acid. The choice of reaction conditions which lead to the splitting off of the residue $R_3$ while the residue $R_4$ is retained does not present any difficulties. Owing to their keto group and the adjacent reactive methylene group, the compounds of the general Formula IV are not only valuable as intermediate products in the series of reactions according to the invention, but also for other syntheses.

For the possible introduction of a residue $R_2'$, i.e. of a residue $R_2$ which is not hydrogen, the keto compounds of the general Formula IV are converted for example into their alkali metal compounds by treatment with an alkali metal amide, such as sodamide, in an inert solvent such as, for example, toluene, benzene or xylene, and these are reacted with suitable reactive esters of lower alkanols or alkenols such as methyl iodide, ethyl bromide, ethyl iodide, n-propyl bromide, n-butyl bromide, allyl bromide, crotyl bromide or β-methallyl bromide.

In the Gringnard reaction, on account of their poor solubility in ether, the keto-compounds to be reacted are preferably added to the solution of the organic magnesium halide compound of general Formula VI as solutions in a benzene hydrocarbon, especially benzene. Suitable halides for the preparation of the Grignard solutions are, for example, methyl iodide, methyl bromide, ethyl iodide, ethyl bromide, ethyl chloride, n-propyl bromide, n-butyl bromide, n-butyl chloride, isobutyl bromide, allyl-bromide, β-methallyl bromide, crotyl bromide, bromobenzene, benzyl chloride, β-phenylethyl bromide and γ-phenylpropyl bromide.

For the conversion of the first formed hydroxy compounds of the general Formula VII into compounds of the general formula VIII, a short boiling in dilute hydrochloric acid is usually sufficient. Further, the dehydration of water may be effected, for example, by distillation in high vacuum or by treatment with potassium bisulphate, polyphosphoric acid or by boiling with toluenesulphonic acid in benzene etc.

Nascent hydrogen, for example hydrogen liberated by introducing sodium into an absolute alcohol solution of a compound of the general Formula VIII, has proved satisfactory as the reducing agent for the double bond present in the 10,11-position. The splitting off of a lower alkyl residue $R_4$ may be effected, for example, by boiling the reduction or hydrogenation products of compounds of the general Formula VIII in 48% hydrobromic acid, while a benzyl residue $R_4$ is split off at lower temperatures in the same reaction medium. In the production of compounds of the general Formula I containing a double bond in the 10,11-position, therefore, intermediate products containing a benzyl residue $R_4$ are suitably employed, since in this case, under the energetic reaction conditions required for the elimination of, for example, a methyl residue $R_4$, rearrangements may take place.

The following examples illustrate in more detail the operation of the series of reactions according to the invention. Parts therein signify parts by weight, and these as to parts by volume as g. are to cc. The temperatures are given in degrees centigrade, in the examples as well as in the foregoing.

*Example 1*

(a) 407 parts of bromine in 250 parts by volume of chloroform are added dropwise into a stirred solution of 600 parts of 5-acetyl-5H-dibenz[b,f]azepine in 1200 parts by volume of chloroform at 5–10°. The colourless solution is then cooled to −10° while stirring, when crystallisation of 5-acetyl-10,11-dibromo-10,11-dihydro-5H-dibenz-

[b,f]azepine takes place. It is filtered off by suction and dried in vacuum. M.P. 136–138°.

(b) 125 parts of the 5-acetyl-10,11-dibromo-10,11-dihydro-5H-dibenz[b,f]azepine prepared according to Example 1(a) are introduced into a solution of 135 parts of sodium methylate in 1000 parts by volume of distilled methanol, and the whole is boiled under reflux for 16 hours with stirring. 500 parts by volume of methanol are then distilled off and the remaining reaction mixture is boiled under reflux for a further 24 hours. After cooling, 500 parts of water are slowly added, the precipitated crystals are filtered off by suction, thoroughly washed with water and dried in vacuo at 60°. They are thereupon recrystallised from 350 parts by volume of absolute ethanol and 10-methoxy-5H-dibenz[b,f]azepine of M.P. 124° is obtained.

(c) 111.5 parts of 10-methoxy-5H-dibenz[b,f]azepine and 95 parts of methyl iodide are dissolved in 500 cc. of absolute, thiophene-free benzene. A suspension of 26 parts of sodamide in toluene is added dropwise at 43–45° in a period of 1½ hours. The reaction mixture is then heated at 55° for an hour and subsequently boiled under reflux for an hour. After cooling, it is treated with water, the benzene layer is separated and washed thoroughly with water. It is then dried over sodium sulphate and concentrated, when crystallisation takes place. The crystals are filtered off by suction and washed with a little cold benzene. The 5-methyl-10-methoxy-5H-dibenz[b,f]azepine obtained melts at 145–146°.

(d) 116 parts of 5-methyl-10-methoxy-5H-dibenz[b,f], azepine are boiled under reflux for an hour in 500 parts of 2 N hydrochloric acid. After cooling, the precipitated crystals are dissolved in benzene. The benzene solution is washed with water, dried and concentrated, when 5-methyl-5H-dibenz[b,f]azepin-10(11H)-one crystallises out. It is filtered off by suction and washed with a little benzene. M.P. 104°. Similarly, if 5-acetyl-3,7-dichloro-5H-dibenz[b,f]azepine is used as the starting material, and steps (a)–(d) are performed, 5-methyl-3,7-dichloro-5H-dibenz[b,f]azepin-10(11H)-one is obtained.

(e) A solution of 85 parts of 5-methyl-5H-dibenz[b,f]-azepin-10(11H)-one in 200 parts of absolute benzene is added dropwise at 5–8° into a Grignard solution prepared from 18.7 parts of magnesium and 108 parts of methyl iodide in 250 parts by volume of absolute ether. The whole is stirred for 24 hours at room temperature and the reaction solution is then poured on a mixture of 500 parts of ice and 300 parts of ammonium chloride. The benzene phase is separated and the aqueous phase is extracted again with benzene. The combined benzene solutions are washed with water, dried and evaporated. The oily residue which remains is covered with absolute ether, when crystallisation takes place. The 5,10-dimethyl-10-hydroxy-10,11-dihydro-5H-dibenz[b,f]azepine so obtained is filtered off by suction and washed with cold ether. M.P. 138°.

(f) 65 parts of the above hydroxy compound are boiled under reflux for 15 minutes with 325 parts by volume of 2 N hydrochloric acid. After cooling, 5,10-dimethyl-5H-dibenz[b,f]azepine crystallises out. It is filtered off by suction and recrystallised from benzene. M.P. 96–97°.

(g) 30 parts of 5,10-dimethyl-5H-dibenz[b,f]azepine are dissolved in 1200 parts by volume of absolute alcohol and treated portionwise with 100 parts of sodium. Towards the end the mixture must be warmed in order to obtain complete solution of the sodium. The alcohol is distilled off as completely as possible, water is added and the product is cooled in an ice bath, when 5,10-dimethyl-10,11-dihydro-5H-dibenz[b,f]azepine crystallises out. M.P. 79–81°.

Instead of a chemical reduction a catalytic hydrogenation may also be carried out.

(h) 24 parts of the above reduction product are boiled under reflux with 150 parts by volume of 48% hydrobromic acid for 3 hours. The reaction mixture is cooled, when the hydrobromide of 10-methyl-10,11-dihydro-5H-dibenz[b,f]azepine crystallises out. It is filtered off by suction and distributed between water and ether, when hydrolysis occurs. The ethereal solution of the base is washed with water, dried over potassium carbonate and evaporated. The free base crystallises on addition of pentane. M.P. 72–73°.

When ethyl iodide is used instead of methyl iodide for the Grignard reaction (e), an oily hydroxy compound is obtained, from which, similarly to (f), (g) and (h), 5-methyl-10-ethyl - 5H - dibenz[b,f]azepine, B.P.$_{0.01}$ 148–150°, 5-methyl-10-ethyl-10,11-dihydro - 5H - dibenz[b,f]-azepine, B.P.$_{0.005}$ 137–139°, and 10-ethyl10,11-dihydro-5H-dibenz[b,f]azepine, M.P. 57–58°, are respectively obtained.

Performing the Grignard reaction (e) with 5-methyl-3,7-dichloro - 5H - dibenz[b,f]azepine - 10(11H) - one and phenylpropyl bromide, a hydroxy compound results, from which, after steps (f), (g) and (h) 10-phenylpropyl-3,7-dichloro-10,11-dihydro-5H-dibenz[b,f]azepine is obtained.

*Example 2*

(a) 268 parts of 10-methoxy-5H-dibenz[b,f]azepine and 192 parts of benzyl chloride are dissolved in 1340 parts of absolute benzene. A suspension of 62 parts of sodamide in toluene is dropped in at 50–55° with vigorous stirring in a period of 2 hours. The reaction mixture is thereupon stirred for a further hour at this temperature, and then boiled under reflux for an hour. After cooling, it is treated with water and the benzene layer is separated. The aqueous phase is extracted with benzene, and the combined benzene solutions are dried and evaporated. On addition of ether to the residue, 5-benzyl-10-methoxy-5H-dibenz[b,f]azepine crystallises out. M.P. 121°.

(b) 318 parts of the product from (a) are boiled for an hour with 1000 parts of 2 N-hydrochloric acid with stirring. At 95° the substance melts to an oil, which however soon solidifies during the boiling. After cooling, the separated crystals are filtered off by suction and washed with water until neutral. After drying, they are recrystallised from benzene, when 5-benzyl-5H-dibenz[b,f]azepine-10(11H)-one of melting point 152° is obtained.

From 10-methoxy-3-chloro-5H-dibenz[b,f]azepine and 11-methoxy-3-chloro - 5H - dibenz[b,f]azepine (obtained from 5-acetyl-3-chloro-5H-dibenz[b,f]azepine after performing steps (a)–(b) as in Example 1), and from 10-methoxy-3,7-dichloro - 5H - dibenz[b,f]azepine (obtained from 5-acetyl-3,7-dichloro-5H-dibenz[b,f]azepine), and benzyl chloride, followed by hydrolysis as in steps (a) and (b) above, the products are 5-benzyl-3-chloro-5H-dibenz[b,f]azepine-10(11H)-one, 5-benzyl - 3-chloro-5H-dibenz[b,f]azepine-11(10H)-one, and 5-benzyl-3,7-dichloro-5H-dibenz[b,f]azepine-10(11H)-one.

(c) 250 parts of 5-benzyl-5H-dibenz[b,f]azepine-10(11H)-one are dissolved in 1250 parts of thiophene-free benzene and 36 parts of sodamide suspended in toluene are dropped into the solution at boiling temperature over a period of 30 minutes, while stirring and passing in nitrogen. After the addition is completed, the reaction mixture is stirred for a further two hours while boiling, and then cooled to 50°. At this temperature 148 parts of methyl iodide are slowly dropped in and the whole is heated at 50–55° for about 16 hours. After cooling, water is added, the benzene layer is quickly separated, dried and concentrated, when 5-benzyl-11-methyl-5H-dibenz[b,f]azepin-10(11H)-one crystallises out. It is filtered off with suction and dried in vacuo. M.P. 178°.

Use of allyl bromide instead of methyl iodide gives 5 - benzyl - 11 - allyl - 5H - dibenz[b,f]azepin - 10(11H)-one. Similarly, allyl bromide and 5-benzyl-3,7-dichloro-5H-dibenz[b,f]azepin-10(11H)-one furnish 5-benzyl-11-allyl - 3,7 - dichloro - 5H - dibenz[b,f]azepin - 10(11H)-one, and 5-benzyl-3,7-dichloro-5H-dibenz[b,f]azepin- 10(11H)-one and crotyl bromide gives 5-benzyl-11-crotyl-3,7-dichloro-5H-dibenz[b,f]azepin-10(11H)-one.

(d) A Grignard solution is prepared from 4.9 parts of magnesium, 60 parts by volume of absolute ether and 28.4 parts of methyl iodide. After the magnesium has dissolved, the solution is cooled to —5° and a solution of 31.3 parts of 5-benzyl-10-methyl-dibenz[b,f]azepin-10(11H)-one in 170 parts by volume of absolute benzene is dropped in at —5° to 0° with vigorous stirring. The reaction mixture is stirred for a further 48 hours at room temperature and is then decomposed with ice and dilute hydrochloric acid. The organic phase is separated and the aqueous phase is extracted with benzene. The combined benzene solutions are dried and evaporated. The oil which remains, consisting of 5-benzyl-10,11-dimethyl - 10 - hydroxy - 10,11 - dihydro - 5H - dibenz[b,f]azepine, is boiled under reflux with stirring for an hour with 160 parts by volume of 2 N hydrochloric acid. The reaction mixture is then cooled and thoroughly extracted with ether. The combined ethereal solutions are washed with water, dried and evaporated. The oil which remains is distilled in high vacuum, when 5-benzyl-10,11-dimethyl-5H-dibenz[b,f]azepine passes over at 200° under 0.002 mm. pressure. The distillate crystallises in the receiver. M.P. 130°.

(e) 100 parts by volume of 45% hydrobromic acid are heated to 90–95° in a stirred flask and 20 parts of finely powdered and sieved 5-benzyl-10,11-dimethyl-5H-dibenz[b,f]azepine are introduced with vigorous stirring, and the whole is stirred at 90–95° for a further 12 hours. It is thereupon cooled, the precipitated hydrobromide of 10,11-dimethyl-5H-dibenz[b,f]azepine is filtered off with suction and washed with hydrobromic acid and then with petrol ether. The filtered crystals are finely powdered and shaken with 2 N caustic soda solution and ether until all the substance is in solution. The ethereal phase is washed with water, dried and evaporated, and the remaining 10,11-dimethyl-5H-dibenz[b,f]azepine is recrystallised from methanol. M.P. 134–135°.

In a similar way, 10-methyl-11-ethyl-5H-dibenz[b,f]azepin of B.P.$_{0.005}$ 164° is obtained.

Performing steps (c)–(e) on 5-benzyl-3-chloro-5H-dibenz[b,f]azepin-10(11H)-one, and 5-benzyl-3-chloro-5H-dibenz[b,f]azepin-11(10H)-one yields 3-chloro-10,11-dimethyl-5H-dibenz[b,f]azepine and on 5-benzyl-3,7-dichloro-5H-dibenz[b,f]azepin-10(11H)-one, 3,7-dichloro-10,11-dimethyl-5H-dibenz[b,f]azepine is obtained. Likewise steps (d)–(e) on 5-benzyl-11-allyl-5H-dibenz[b,f]azepin-10(11H)-one, 5-benzyl-11-allyl-3,7-dichloro-5H-dibenz[b,f]azepin-10(11H)-one and 5-benzyl-11-crotyl-3,7-dichloro-5H-dibenz[b,f]azepin-10(11H)-one yield respectively 10-methyl-11-allyl-5H-dibenz[b,f]azepine, 3,7-dichloro - 10 - methyl - 11 - allyl - 5H - dibenz[b,f]azepine and 3,7 - dichloro - 10 - methyl - 11 - crotyl - 5H - dibenz[b,f]azepine.

Example 3

20 parts of the 10,11-dimethyl-5H-dibenz[b,f]azepine obtained according to Example 2 are shaken in 300 parts of ethanol in the presence of 8 parts of palladium charcoal at room temperature until the theoretical amount of hydrogen has been taken up. The catalyst is filtered off and the filtrate is evaporated in vacuo. The remaining 10,11-dimethyl-10,11-dihydro-5H-dibenz[b,f]azepine crystallises on addition of pentene. M.P. 96–97°.

10 - methyl - 11 - ethyl - 10,11 - dihydro - 5H - dibenz[b,f]azepine is obtained in a similar way.

Example 4

(a) 75 parts of 5-benzyl-5H-dibenz[b,f]azepin-10(11H)-one in 250 parts by volume of benzene are dropped at 0° into a Grignard solution consisting of 12.5 parts of magnesium and 78 parts of ethyl iodide in 150 parts by volume of absolute ether, and the reaction mixture is then stirred for 36 hours at room temperature. It is thereupon poured on ice and dilute hydrochloric acid, the separated oil is taken up in ether, and the ether solution is thoroughly washed with water, dried and evaporated. 5 - benzyl - 10 - ethyl - 10 - hydroxy - 10,11-dihydro-5H-dibenz[b,f]azepine remains, which without further purification is boiled with 320 parts of 2 N hydrochloric acid with stirring. After cooling, the reaction mixture is extracted with ether, the ether solution is thoroughly washed, dried and evaporated, when the 5-benzyl-10-ethyl-5H-dibenz[b,f]azepine remains as an oil.

(b) 55 parts of this oil are stirred with 275 parts of 48% hydrobromic acid for an hour at 90–95° internal temperature, when the hydrobromide of 10-ethyl-5H-dibenz[b,f]azepine crystallises out. After cooling, the hydrobromide is filtered off by suction and washed with hydrobromic acid and then with petroleum ether. To liberate the base, the hydrobromide is boiled up with 250 parts by volume of ethanol and treated with 50 parts by volume of concentrated aqueous ammonia with stirring and boiled again until all the substance is in solution. The ethanol solution is concentrated to half its volume and treated with 500 parts of water, when 10-ethyl-5H-dibenz[b,f]azepine slowly crystallises out. It is filtered off by suction, dried in vacuo and recrystallized from petroleum ether. M.P. 61–63°.

10-methyl-5H-dibenz[b,f]azepine, M.P. 133–134°, and 10-benzyl-5H-dibenz[b,f]azepine, M.P. 148°, may be similarly prepared.

Example 5

(a) 66.9 parts of 5-methyl-5H-dibenz[b,f]azepin-10(11H)-one (cf. Example 1(d)) in 160 parts by volume of benzene are dropped at —2° to 0° into a Grignard solution consisting of 14.7 parts of magnesium and 94.2 parts of bromobenzene in 180 parts by volume of ether, and the whole is stirred for 36 hours at room temperature. It is then poured on ice and dilute hydrochloric acid and the decomposition product is thoroughly extracted with ether. The organic phase is washed, dried and concentrated, when some starting material crystallises out. This is filtered off by suction and the filtrate is completely evaporated. The oily hydroxy compound which remains is boiled under reflux for 30 minutes with stirring with 245 parts by volume of 2 N hydrochloric acid. On cooling, 5-methyl-10-phenyl-5H-dibenz[b,f]azepine crystallizes out. It is filtered off by suction and washed with water until neutral. M.P. 88–93°.

(b) 40 parts of the product from (a) are dissolved in 1500 parts by volume of absolute ethanol and 135 parts of sodium cut into small pieces are quickly introduced. When all the sodium has dissolved, the ethanol is evaporated off as far as possible in vacuo and the residue is treated with 500 parts of water. The oil which separates is dissolved in ether, and the ethereal solution is thoroughly washed with water and dried over sodium sulphate. After evaporation of the ether, 5-methyl-10-phenyl-10,11-dihydro-5H-dibenz[b,f]azepine remains as an oil. This is boiled under reflux for two hours with 190 parts by volume of 45% hydrobromic acid. After cooling, the precipitated hydrobromide of 10-phenyl-10,11-dihydro-5H-dibenz[b,f]azepine is filtered off by suction. It is shaken with water and ether until all the substance is in solution. The ethereal solution is washed, dried and evaporated. The 10 - phenyl - 10,11 - dihydro-5H-dibenz[b,f]azepine which remains crystallises from ethanol. M.P. 154°.

The following compounds may be obtained in the manner described in the above examples:

3,7-dichloro-10-benzyl-11-methyl-5H-dibenz[b,f]azepine,
10-methyl-3-chloro-5H-dibenz[b,f]azepine,
10-ethyl-3-chloro-5H-dibenz[b,f]azepine,
10-benzyl-11-methyl-10,11-dihydro-5H-dibenz[b,f]azepine,
10-benzyl-11-methyl-5H-dibenz[b,f]azepine,
10-benzyl-10,11-dihydro-5H-dibenz[b,f]azepine, and
10-phenyl-5H-dibenz-[b,f]azepine.

More particularly, this invention relates to 5H-dibenz[b,f]azepin-10(11H)-ones of the general Formula X

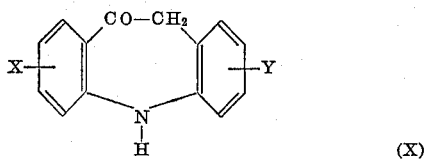

wherein X and Y have the meanings given with Formula XI, which are obtained in good yield from 10-alkoxy-5H-dibenz[b,f]azepines of Formula I by heating these for a short time, e.g. from 5 to 60 minutes in 0.5–5 N aqueous mineral acid, e.g. hydrochloric, sulfuric or phosphoric acid.

5H-dibenz[b,f]azepin-10(11H)-ones of Formula X have not been known up to now. They possess a valuable structural feature in the reactive grouping —CO—CH$_2$—, which may be derived in a number of ways, and which also accounts for their great versatility as intermediates. On the other hand, the very reactivity of this grouping limits the number of methods suitable for its preparation, the method of the invention being the preferred one. Thus, mono-bromoazepines of Formula IV would appear to be suitable starting materials for 5H-dibenz[b,f]azepin-10(11H)-ones of Formula V if the former were subjected to acid or base catalyzed hydrolysis. However, no 5H-dibenz[b,f]azepin-10(11H)one resulted on treatment of 10 bromo-azepines IV with aqueous acid, nor on treatment with base in water or water containing organic media.

5H-dibenz[b,f]azepin-10(11H)-ones of Formula V are not only versatile intermediates, e.g. in the production of biologically active compounds useful in medicine, such as those of Formula X, they are also active as antioxidants.

Suitable starting materials of general Formula I are, e.g. 10-methoxy- or 10-ethoxy-5H-dibenz[b,f]azepine, their 3-chloro-, 3-bromo-, 3-ethyl- and 3,7-dichloro-derivatives, such 10-methoxy- and 10-ethoxy-compounds being preferred. Other suitable starting materials consist of, e.g. the 10-propoxy-, 10-isopropoxy-, 10-butoxy- and 10-amyloxy-derivative of 5H-dibenz[b,f] azepine and its 3-chloro-, 3-bromo-, 3,7-dichloro- and 3-ethyl-derivative. Preferred acids for the hydrolysis according to the invention are hydrochloric and trichloracetic acid.

The following examples illustrate in more detail the operation of this process according to the invention. Parts therein mean parts by weight, and these are to parts by volume as g. are to cm.$^3$. The temperatures are given in degrees centigrade.

Example 6

2 parts of 10-ethoxy-5H-dibenz[b,f]azepine are suspended in 20 parts by volume of 2 N hydrochloric acid and boiled under reflux for 10 minutes, when the suspended substance first of all liquefies and then becomes solid again. The reaction mixture is cooled, and the crude 5H-dibenz[b,f]azepin-10(11H)-one is filtered off by suction and washed with water until neutral. After recrystallisation from alcohol it melts at 145–146°.

The 3,7-dichloro-5H-dibenz[b,f]azepin-10(11H)-one of melting point 318–320° is similarly obtained from 10-methoxy-3,7-dichloro-5H-dibenz[b,f]azepine.

This application is a continuation-in-part of our co-pending application Serial No. 156,552, filed November 8, 1961 (allowed and forfeited), which is a divisional application of our co-pending application Ser. No. 69,302, filed November 15, 1960, and now abandonded, and Serial No. 128,955, filed August 3, 1961, which is a continuation-inpart of said application Serial No. 69,302.

What we claim is:
1. A compound of the formula

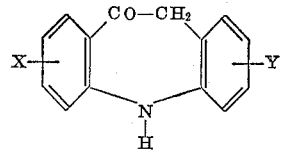

wherein X is a member selected from the group consisting of hydrogen, chlorine, bromine, lower alkyl and lower alkoxy, and
Y is a member selected from the group consisting of hydrogen, chlorine, bromine and lower alkyl.
2. 5H-dibenz[b,f]azepin-10(11H)-one.
3. 3,7-dichloro-5H-dibenz[b,f]azepin-10(11H)-one.
4. A compound of the formula

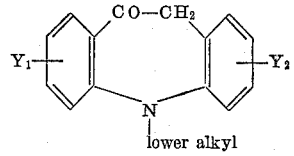

wherein $Y_1$ is a member selected from the group consisting of hydrogen, chlorine, bromine, lower alkyl and lower alkoxy, and $Y_2$ is a member selected from the group consisting of hydrogen, chlorine, bromine and lower alkyl.
5. A compound of the formula

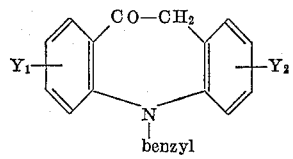

wherein $Y_1$ is a member selected from the group consisting of hydrogen, chlorine, bromine, lower alkyl and lower alkoxy, and
$Y_2$ is a member selected from the group consisting of hydrogen, chlorine, bromine and lower alkyl.

References Cited in the file of this patent
UNITED STATES PATENTS

| | | |
|---|---|---|
| 2,674,596 | Hafliger et al. | Apr. 6, 1954 |
| 2,764,580 | Schindler et al. | Sept. 25, 1956 |